(12) United States Patent
Zweber

(10) Patent No.: US 6,431,794 B1
(45) Date of Patent: Aug. 13, 2002

(54) DOCK TECHNOLOGY

(76) Inventor: Michael J. Zweber, 24746 Cedar Point Rd., New Prague, MN (US) 56071

( * ) Notice: Subject to any disclaimer, the term of this patent is extended or adjusted under 35 U.S.C. 154(b) by 0 days.

(21) Appl. No.: 09/815,680

(22) Filed: Mar. 23, 2001

(51) Int. Cl.$^7$ ................................................. E02B 3/20
(52) U.S. Cl. ................ 405/221; 405/218; 405/219; 405/220; 403/385; 403/391; 403/234; 248/230.3; 248/230.6; 248/231.71; 248/231.41
(58) Field of Search ................................. 405/218, 219, 405/220, 221; 114/263, 264, 265; 52/712, 704; 248/230.3, 230.6, 231.71, 231.41; 403/373, 321, 374.1, 374.2, 374.3, 385, 391, 234; 14/26, 27

(56) References Cited

U.S. PATENT DOCUMENTS

| 2,057,329 | A |   | 10/1936 | Duff |
| 2,152,891 | A |   | 4/1939 | Kohnke |
| 3,614,871 | A |   | 10/1971 | Nordell |
| 3,760,754 | A |   | 9/1973 | Drummond et al. |
| 3,861,816 | A | * | 1/1975 | Zaidan ........................ 403/385 |
| 4,132,178 | A | * | 1/1979 | Mueller et al. .............. 108/106 |
| 4,832,299 | A |   | 5/1989 | Gorton et al. |
| 5,156,493 | A |   | 10/1992 | Johnson |
| 5,322,253 | A | * | 6/1994 | Stevens .................... 248/125.1 |
| 5,355,539 | A |   | 10/1994 | Boettger |
| 5,385,324 | A | * | 1/1995 | Pryor et al. ............... 248/228.3 |
| 5,495,631 | A | * | 3/1996 | Connor et al. ................. 14/2.5 |
| 5,649,565 | A |   | 7/1997 | Mulla |
| 5,699,988 | A | * | 12/1997 | Boettger et al. .......... 248/122.1 |
| 5,902,463 | A | * | 5/1999 | Terrase ................... 204/196.17 |
| 5,975,790 | A | * | 11/1999 | Nogami ....................... 269/41 |

* cited by examiner

Primary Examiner—Heather Shackelford
Assistant Examiner—Katherine Mitchell
(74) Attorney, Agent, or Firm—R. C. Baker & Associates, Ltd.

(57) ABSTRACT

A dock support bracket has a central clamp of general C shape having an internal channel and opposing first and second side arms. The bracket has a clamping screw and a first beam mounting base on the first side arm and has an abutment and a second beam mounting base on the second side arm. The second beam mounting base is angular to the second side arm and to the first beam mounting base. Dock section beams can be mounted on the respective mounting bases of the bracket to form a dock. A dock support post can be received within the channel of the clamp, and pressed by the clamping screw of the first side arm against slippage on the post. Docks formed using the bracket have minimal or no side projecting hardware.

26 Claims, 7 Drawing Sheets

DOCK TECHNOLOGY

This invention relates to dock technology and more particularly to dock technology that permits the formation of dock structures having minimal or no edge projecting support hardware that could cause damage to water craft or injury to people. Key aspects of the invention include a new dock support bracket and the manner of its use.

BACKGROUND OF THE INVENTION

Dock structures of the invention are generally those of the type that are installed in the spring and dismantled in the fall before winter freezing of the lake.

A serious problem with existing dock structures designed for lake use is projection of support hardware outwardly from edges of the dock. The projecting hardware can damage water craft and injure people. The hardware that projects is used to fix the dock in position on support posts. It is critical to have hardware for mounting the dock on support posts over water.

A common type of dock support hardware is that requiring linear sliding of the hardware from an end of a dock support post to a location along the post where the hardware is fixed for supporting the dock. Stated another way, it is bad to have dock support hardware that projects outward from the edges of a dock, and worse to have dock support hardware that cannot be mounted on a dock support post except by sliding the hardware along the dock support post from one end of it. Sliding the hardware along dock support posts requires much physical effort to lift the dock structure over the posts during installation and removal of the dock structure.

Still further, some other types of dock support hardware that don't require loading over an end of a dock support post have more than a few parts that have to be fitted together. Thus, the user risks possible loss of parts by accidental dropping of them into the water as the hardware is assembled during the mounting of the dock on a support post. Multiple loose parts for any hardware structure present not only the risk of possible loss but also the possibility for easy erroneous arrangement by amateurs who are frequently the ones involved in lake dock installation and removal.

It is to a solution of such problems as aforementioned that this invention is directed.

BRIEF SUMMARY OF THE INVENTION

This invention provides dock structures that not only have minimal or no edge projecting dock support hardware, but also dock structures that can be laterally loaded on a dock support post and fixed in position with minimal labor steps. This is made possible by the unusual dock support hardware of the invention.

The dock support hardware of this invention is a bracket that can be fabricated to have only two parts; and these parts may be so connected (as by being threaded together) that it is unnecessary to ever separate one from the other when the bracket (alone or as part of an entire dock section or module) is mounted or de-mounted on a dock support post. A significant feature of the bracket is that it is peculiarly adapted for positioning at a corner of a dock section and is designed to have dock frame beams (e.g., a header or crossbeam as well as a joist or stringer beam of the dock section) mounted to the bracket in a manner without hindrance to lateral loading of a dock support post in the bracket.

Other features of the bracket that permit the formation of the unusual docks of the invention include a central clamp of general C shape having an internal channel allowing for lateral access of at least a substantial part of a dock support post therein, plus a first beam mounting base on one side arm of the clamp, and a second beam mounting base on the other side arm of the clamp. The first and second mounting bases are for mounting dock section beams thereto. The mounting bases of the new bracket are spaced from each other by the clamp, and they are in an angular relationship to each other.

The clamp portion of the bracket has an abutment structure internally facing the channel of the clamp at a location adjacent the outer end of one side arm of the clamp. A clamping screw is mounted in the other side arm for applying pressure in an opposing relationship across the channel toward the abutment structure for the purpose of pressing a dock support post against the abutment structure and fixing the entire bracket against slippage on the dock support post.

Still other advantageous features and benefits of the invention will be evident as this description proceeds.

DESCRIPTION OF THE DRAWINGS

FIG. 9 being an inner perspective view showing one beam in mounted condition on the bracket and the other in spaced relationship but aligned for telescoping connection to the bracket, FIG. 10 being an outer perspective view showing both beams in telescopingly mounted condition on the bracket; and FIG. 11 being a schematic cross-sectional view of a telescopingly mounted beam on the bracket; FIG. 12 being an inner perspective view with one beam in a spaced but aligned relationship for a telescoping connection, and FIG. 13 being an outer perspective view.

DESCRIPTION OF THE INVENTION

Figure 1:
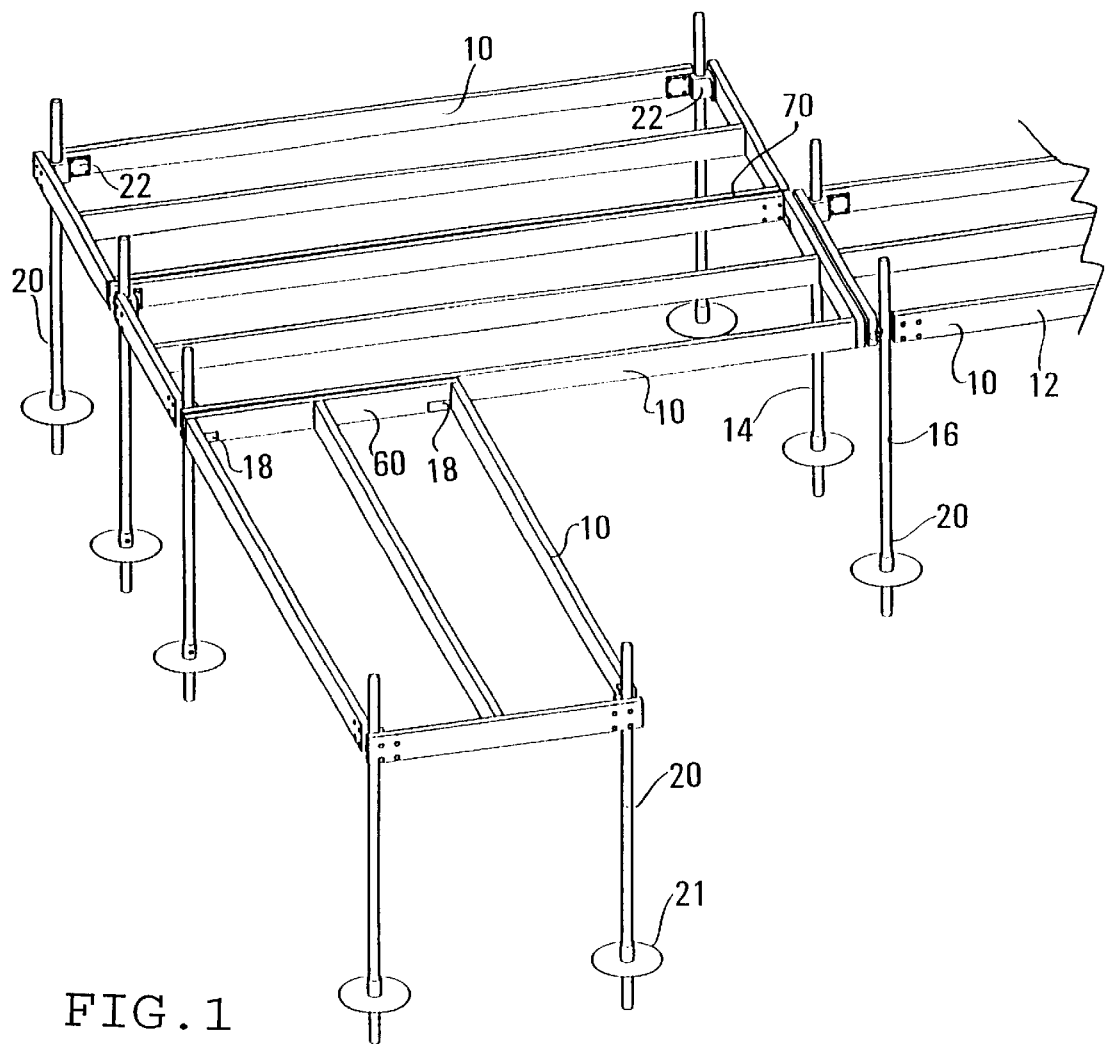
FIG. 1 is a schematic perspective view of a dock structure made up of a plurality of sections or modules incorporating the teachings herein; (the horizontal deck beams or boards are omitted from the sections or modules and one section has parts broken away)
Figure 2:
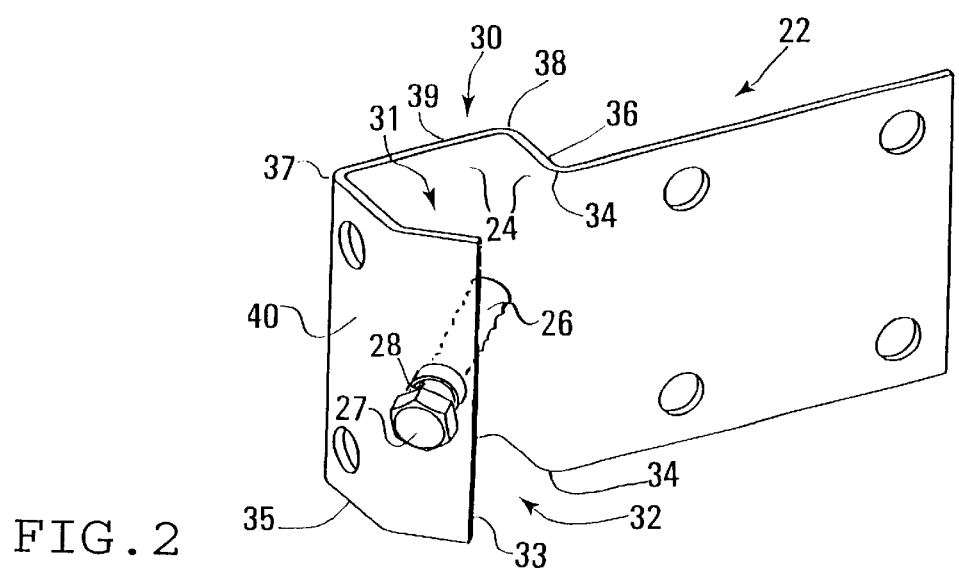
FIG. 2 is a schematic perspective view of an exceedingly simple illustrative structure for a dock support bracket of the invention.

Referring particularly to FIG. 1, dock structures of the invention generally are formed of a plurality of sections or modules fastened together in an appropriate manner to gain the desired length and width for the total dock structure.

Four such sections 10 are shown in FIG. 1. Generally a dock section such as the one identified as 12 extends from the shore line out to support posts 14, 16; and from there on, added sections 10 create the length and width and direction desired. Each added section is supported at one edge in a saddle or saddles 18 (see FIGS. 1, 3, and 4) fixed on an earlier section, and by dock support posts 20 at the other edge (e.g., at the outer end or outer side) of the added section. Support posts 20 may be equipped with discs 21 that function to limit penetration of the posts into a lake bottom. Suitable saddles 18 are little more than U-shaped hardware items, usually of iron or steel. They are mounted as by bolts or the like on the frame beams (e.g., crossbeams or stringer beams) at appropriate locations on a dock section (generally near a corner) so as to be available for a crossbeam 60 or stringer beam 70 of a further or added section or module to rest within the saddle.

A key feature of the docks of this invention is a dock support bracket 22, which may vary in design but has several main features and relationships common to all designs of the invention. This bracket is at the outer (outboard) end corners or at the outer (outboard) side corners of a section of the dock and is the key element for mounting to a dock support post 20 as well as the key element for receiving the mounting of a crossbeam 60 and a stringer beam 70 of a single dock section.

Of particular interest is the fact that the ideal practice of the invention permits a single corner mounting bracket to be used either at the left or the right corner of a dock section. A single bracket can be used at either the left or right corner simply by inverting it. This allows for economy of manufacture and maintenance of inventory since a bracket of one single design has the versatility of being useful at both left and right corners of an edge or side of any section or module.

Turn now to FIGS. 2 through 5, which illustrate an exceedingly simple and even primitive type of embodiment for the new bracket of the invention. It is emphasized that strength for various portions of the new bracket structure can be improved by employing reinforcing ridges or small flanges, or even thickening of walls, as needed.

Figure 3:
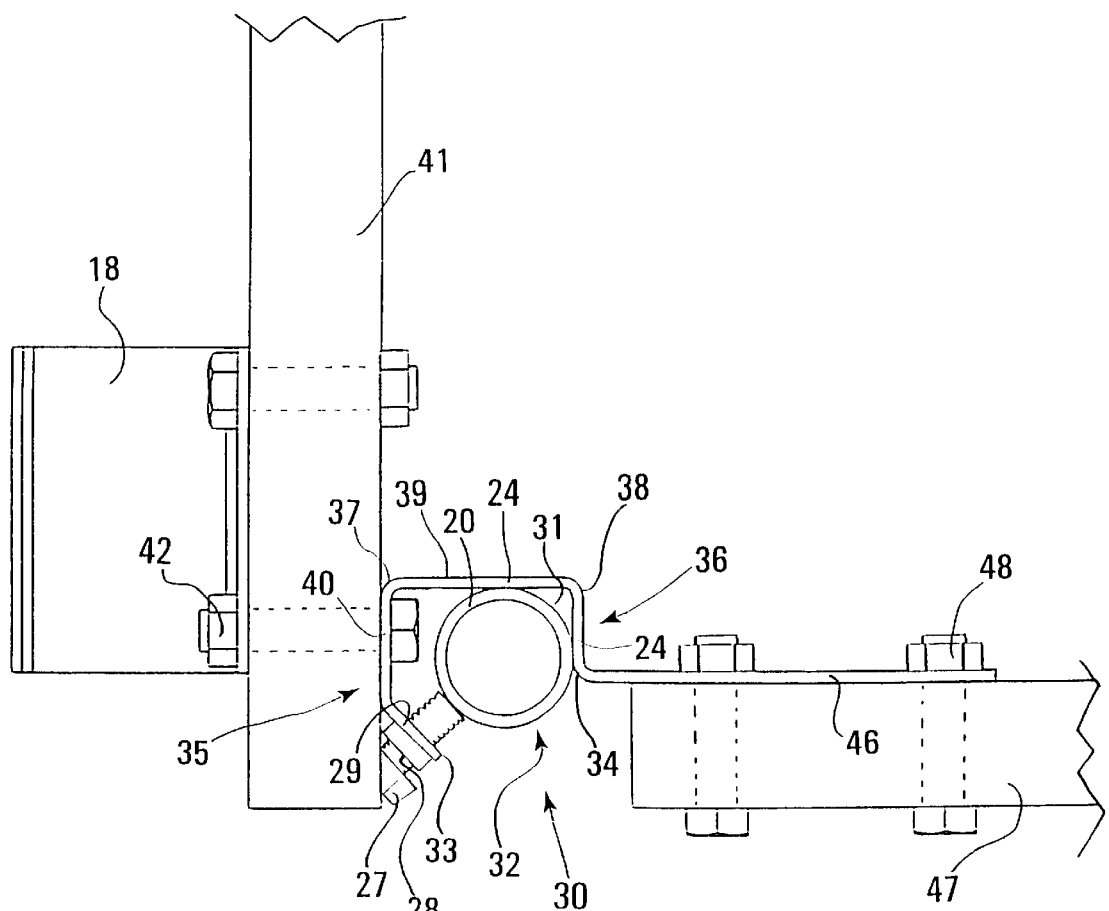
FIGS. 3, 4, and 5 are respectively a top view, an outer perspective view, and an inner perspective view of the bracket of FIG. 2 in mounted condition on a dock support post, with section beams on the bracket partially broken away.

The new dock support bracket 22 has a central clamp 30 of general C shape. The C-shape defines an internal channel 31 with a lateral access opening 32. This access opening 32 is between outer ends 33, 34 of the first 35 and second 36 side arms of the C shape for the clamp. The first side arm 35 extends from the outermost part of it that forms its outer end 33 to the inner end 37 of it. The second side arm 36 extends from its outer end 34 to its inner end 38. Importantly, the channel 31 is adapted to laterally receive through the lateral access opening 32 at least a substantial part of a dock support post 20 in the channel. Further, the dock support post 20 is aligned with the channel (i.e., aligned with the height or vertical length of the channel). FIG. 3 illustrates this feature, namely the fact that the dock support post extends in parallel fashion through the vertical channel.

The clamp has an abutment structure 24 that internally faces the channel at a location adjacent the outer end 34 of the second side arm 36 of the C shape. In the simplified bracket of FIGS. 2–5, this abutment structure 24 is a surface on the interior of the channel 31 and in fact is on the interior surface of the second side arm 36 and the interior surface of the back connector 39 (which connector 39 is a wall in FIG. 2–5). In ideal brackets, the abutment structure is so oriented that a part of it is toward or on a back wall or rear connector between the side arms 35 and 36 of the clamp, and part of it is on or toward the second side arm, as particularly illustrated in FIGS. 2–5; but the abutment structure 24 may be formed so as to be supported by or on the second side arm 36 alone, as illustrated for the second side arm 80 in FIG. 8.

The abutment structure must internally face the channel at a location adjacent the outer end of the second side arm, that is, the side arm that carries the second beam mounting base (e.g., a flange wall). Exact details of structure for the abutment structure may vary, and the illustrations in the drawing (including the illustrations in FIGS. 7 and 8) are but illustrative.

A further feature of the clamp is that it has a clamping screw 26 with a head 27 for effecting rotation of it. The clamping screw 26 is in the nature of a threaded bolt mounted in a cooperatively threaded bore 28 through the first side arm. The clamping screw 26 is designed for applying pressure in an opposing relationship across the channel 31 of the clamp 30 toward the abutment structure 24. The pressure toward the abutment structure is applied on a dock support post 20 that has been laterally received through the lateral access opening 32 of the clamp 30 into the channel 31 of the clamp. (Properly speaking, the entirety of a post may not be entirely within the channel of a clamp, but at least a substantial part of a post is within the channel so that the post does not have any part of it that is outside the plane of the outer sides of framing beams for a dock section.) The pressure of the clamping screw is applied by rotatably threading the clamping screw 26 in the bore 28 to press the dock support post 20 against the abutment structure 24 and fix the clamp and the entire bracket against slippage at a particular selected location on the dock support post.

An important feature of the bracket is its first beam mounting base 40. The first beam mounting base is on the first side arm of the clamp. Stated another way, this first beam mounting base is on what can be called and therefore known as an anchor wall. The anchor wall 40 is illustrated in FIG. 5 as being integral (in whole or in part) with the first side arm 35 of the clamp. Ideally, an anchor wall is integral (at least in part) with the first side arm of the clamp; and in some instances (as in FIGS. 2–5), the entire anchor wall may be integral with the first side arm of the clamp. The outer or outboard side of the anchor wall (i.e., the side away from the clamp 30) functions as the first beam mounting base for mounting a dock section frame beam (e.g., a crossbeam) thereto; or put another way, the outer side is for receiving a frame beam 41 for mounting thereto. The inner side of the anchor wall (at least at its portion integral with and therefore common to the first side arm of the clamp) faces the internal channel 31 of the clamp. (Note that as illustrated in FIGS. 6 and 7, the anchor wall 40 may extend beyond the length of the first side arm 35 of the clamp. It may extend beyond the first side arm in a direction substantially parallel to at least a portion of the first side arm and away from the inner end of the first side arm, as illustrated in FIGS. 6 and 7.)

An important function of the first beam mounting base (e.g., anchor wall) is to provide a base (i.e., a first beam mounting base) against which a deck framing beam for a dock section is mounted, as by bolts and nuts 42 or welds(if metal beams and brackets are used) or any other suitable fastening structure. An optional feature of the anchor wall not illustrated is that it may have an outwardly extending (i.e., outboard direction) bottom flange along its length. (Thus, a useful anchor wall may be in the nature of an angle iron if an outward bottom flange is used.) The bottom flange, if present, serves the function of supporting the bottom surface of a frame beam 41. The anchor wall itself (in its vertical part or part parallel with the internal channel 31) should preferably have a uniformly flat or planar outer surface (suitably with holes for bolts extending through the wall) for receiving the deck beam or dock section beam that will be bolted to it; but the inner surface of the anchor wall (facing channel 31) may be contoured or varied in structure, so long as a bolt hole or other appropriate feature for fastening a frame beam to the anchor wall is maintained.

Spaced from the first beam mounting base (e.g., anchor wall 40) by the clamp 30 is a second beam mounting base (e.g., flange wall 46). The flange wall 46 is on the second side arm of the clamp. As illustrated in FIGS. 2–5, it is united solely at one end to the outer end 34 of second side arm of the clamp 30. The flange wall ideally will have an outer or outboard side that functions as the second beam mounting base; and the outer side suitably may be of uniformly flat or planar character similar to that for the outer side of the anchor wall. The outer side receives a dock frame beam 47 (such as a stringer beam) for mounting to it. The angular relationship of the flange wall 46 as it extends away from the outer end 34 of the second side arm 36 is such that a stringer beam 47, as mounted to the flange wall 46, extends in a direction perpendicular to a crossbeam 41 as mounted to the anchor wall 40. Stated another way, the anchor wall 40, or at least the outer side or mounting base surface thereof, and the flange wall 46, or at least the outer side or mounting base surface thereof, are in perpendicular relationship (although variation from a perpendicular relationship can be useful where less preferred dock sections such as those of pentagon shape may be formed).

To be noted is that the anchor wall 40 and the flange wall 46 are not only spaced from each other by the clamp 30 but are ideally in planes that are parallel to the internal channel 31 of the clamp, and preferably (for rectangular dock sections) also are in planes that are perpendicular to each other. Significantly, the beam 47 mounted to the flange wall 46 is not allowed to extend past the outer end 34 of the second side arm 36 of the clamp, for the reason that the lateral access opening 32 between the outer ends 33, 34 of the first and second side arms of the C shape for the clamp must always remain open and unblocked. On the other hand, the beam 41 mounted to the anchor wall 40 can be mounted to extend past or beyond the outer end 33 of the first side arm 35 of the clamp. It preferably extends beyond the outer end 33 to a termination end for the beam 41 in or at the plane extending as a continuation of the outer surface of the beam 47, thus to form a right angle corner with an adjacent recess or access opening 32 between beams 41 and 47 for receipt of a dock support post.

In the most ideal structures, the clamping screw 26 of the dock support bracket is mounted in a threaded bore of the first side arm at an orientation such that the longitudinal length of the clamping screw 26 is at an angle somewhere between about 20 and 70 degrees from the planar outer side or surface of the anchor wall 40. This is accomplished by having a strong (preferably reinforced) angular foundation structure 29 at the outer end 34 of the first side arm 35; and this angular foundation structure at the outer end is preferably in an angular relationship (as at its outer surface) of between about 20 and 70 degrees to the anchor wall 40. The threaded bore 28 for the clamping screw is ideally located in the angular foundation structure 29 or reinforced wall section of the first side arm 35. Recognize that, as particularly illustrated in FIG. 6, the structure 50 carrying the bore 28 for the clamping screw may itself form the angular foundation structure 29 of the first side arm of the clamp. The angular nature is shown in structure 50 by the outer side of the reinforcement band as it projects as part of first side arm; see the outer side of angular foundation 50 as it is angularly related to the anchor wall. (The inner side of foundation structure 50 may or may not be at the same angle as the outer side.)

The detailed bracket illustrated in FIGS. 6 and 7 is most ideally formed by casting, but it is important to recognize that brackets of the invention may be formed in a variety of ways. Casting is not the sole way contemplated for its formation.

What is interesting about the bracket of FIGS. 6 and 7 is that the clamp 30 has a middle internal reinforcing band 52 extending in a circular manner between the upper 53 and lower 54 edges of the clamp. The internal band 52 extends circularly about a significant portion of the internal channel 31. The middle reinforcing band 52 projects to form the foundation structure 50 aforediscussed. Band or thickness 52 is not especially designed to serve (at its portion opposite its foundation structure 50 for the clamp screw 26) as an abutment structure for a dock support post to be pressed against. Rather, it serves at that internal portion adjacent the outer end of the second side arm as a unifying or strengthening structure alone. Of course, at its portion 50, it serves as a very solid base for the angularly oriented bore 28 for the clamping screw. The bore 28 is angularly oriented with respect to both the anchor wall 40 and the flange wall 46, and the bore 28 extends through the structure 50 that forms the outer end 33 of the first side arm 35.

In FIGS. 6 and 7, the abutment structure for the dock support post actually consists of upper and lower areas 24a, 24b at the upper 53 and lower 54 flange-like edges of the clamp 30 of the bracket. In effect, the abutment structure is formed by edges 24a and 24b of the upper 53 and lower 54 strengthening flanges. Thus, in FIGS. 6 and 7, the abutment structure extends as a continuation of the flanges 53 and 54. The flanges 53 and 54 also lend reinforcement to the first side arm 35, the anchor wall 40, back connection 39, the second side arm 36, and the flange wall 46.

To be noted is that the anchor wall 40 of the bracket in FIGS. 6 and 7 is extended and projects rearwardly from the back connection link or wall 39 between the inner ends of the first 35 and second 36 side arms of the central clamp. Stated another way, the anchor wall (which forms the first beam mounting base) extends beyond the first side arm in a direction substantially parallel to at least a portion of the first side arm. The direction is away from the inner end of the first side arm (i.e., a rearward direction).

Figure 4:
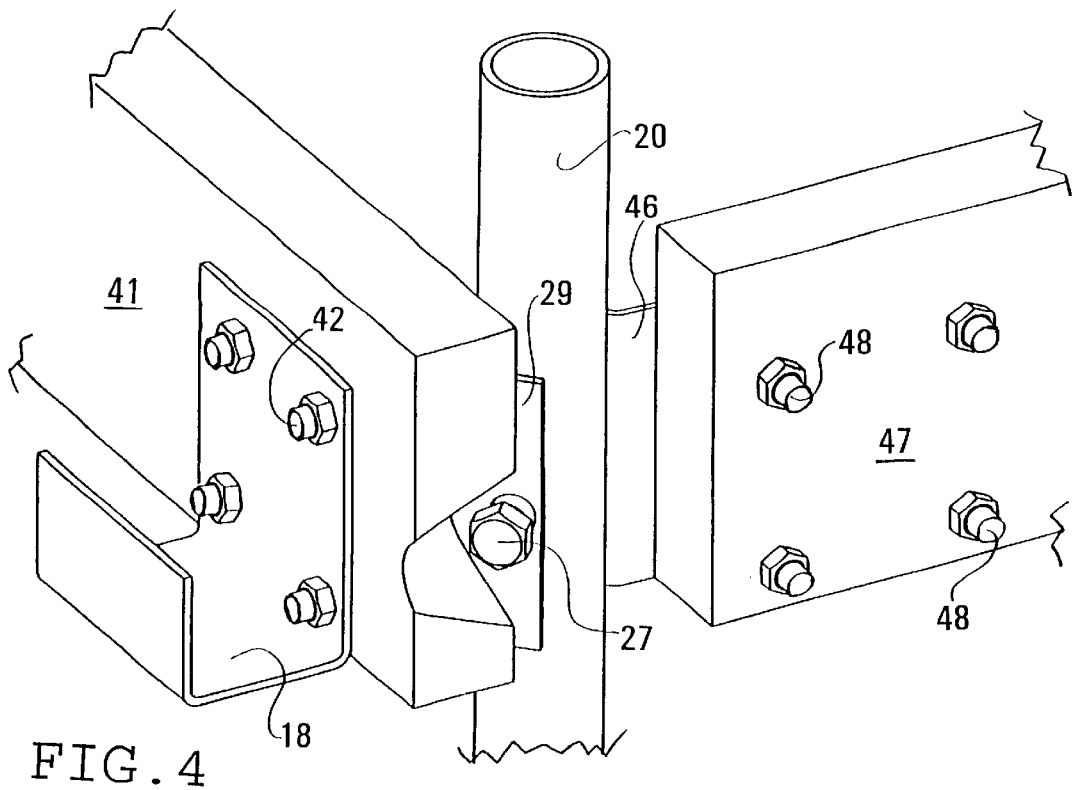
Figure 5:
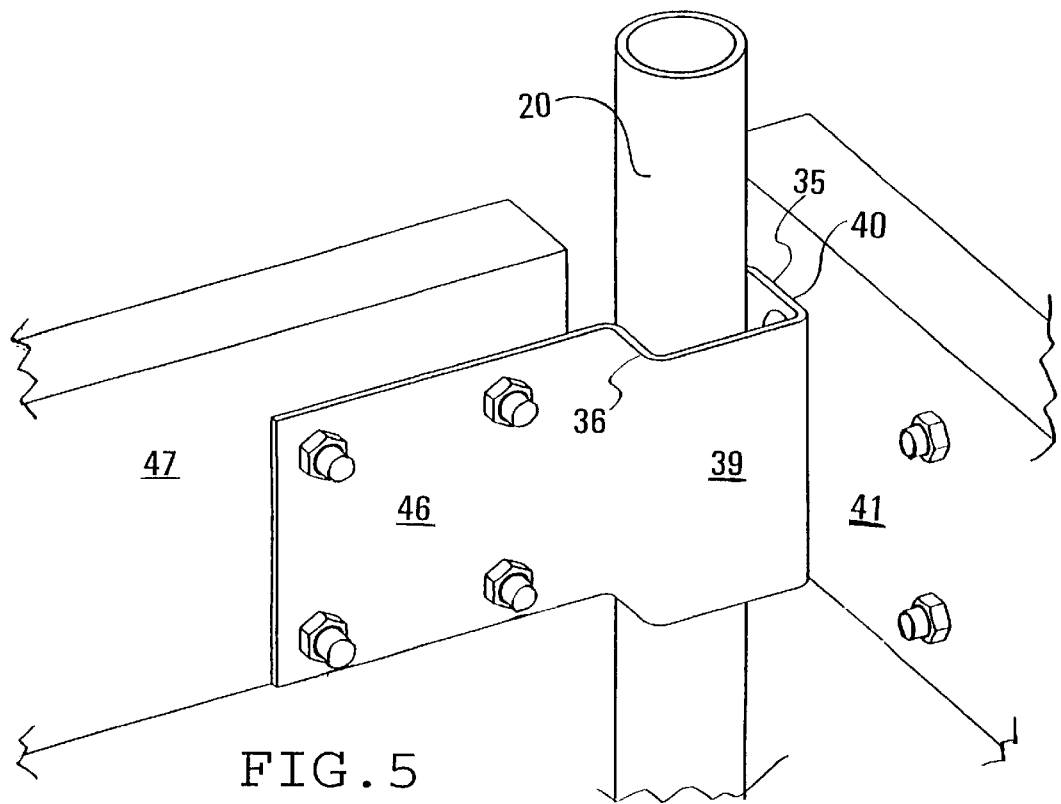
Figure 6:
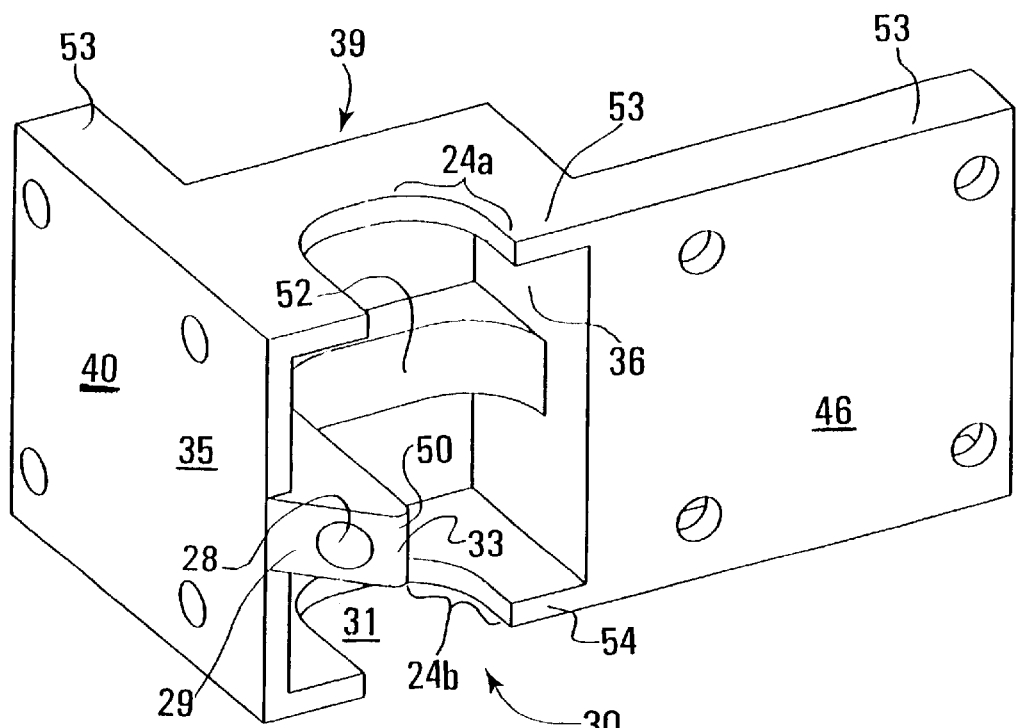
FIGS. 6 and 7 are respectively a schematic outer perspective view and a schematic inner perspective view of an illustrative cast dock support bracket of the invention with the clamping screw omitted.
Figure 7:
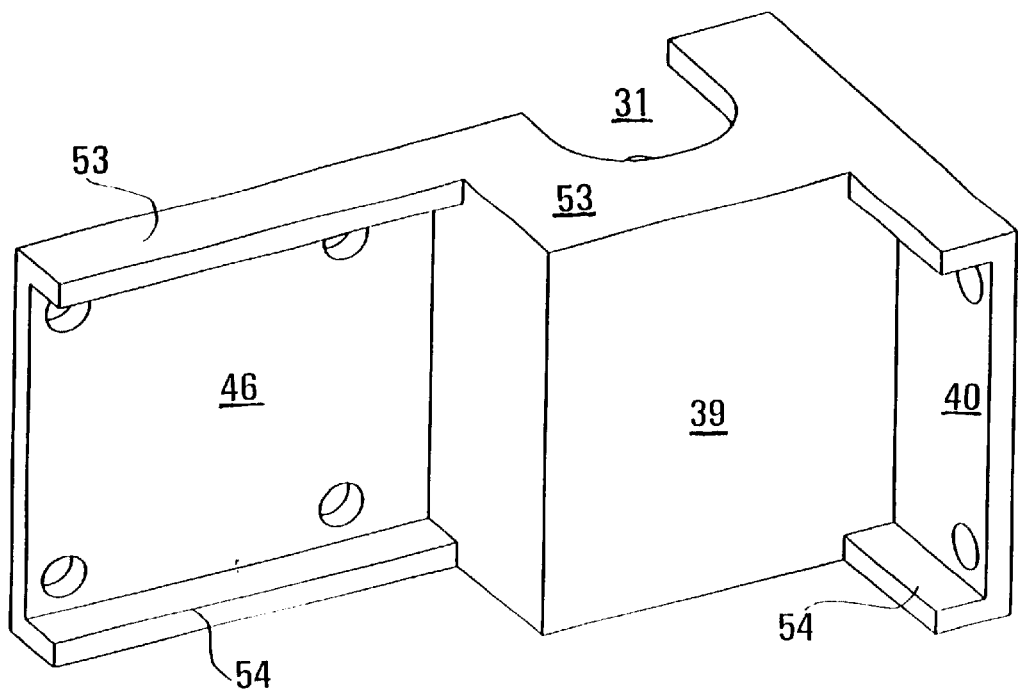

In the bracket illustrated in FIGS. 2–5, and also in the bracket of FIGS. 6 and 7, the clamping screw 26 (at its shaft) has an angular relationship to the anchor wall and also to the flange wall. The angular relationship of the clamping screw to the anchor wall as well as to the flange wall places the outer end head 27 or tightening element (for rotation of the screw) at a location that modestly might interfere with the presence of a portion of a frame beam at that location. To obviate that problem, the ideal approach is to carve out a small portion of the end of the frame beam (between its upper and lower edges) to provide access to the head 27 of the clamping screw for turning it to clamp a dock support post 20 in pressed condition against the abutment structure. This feature is illustrated in FIG. 4.

Figure 8:
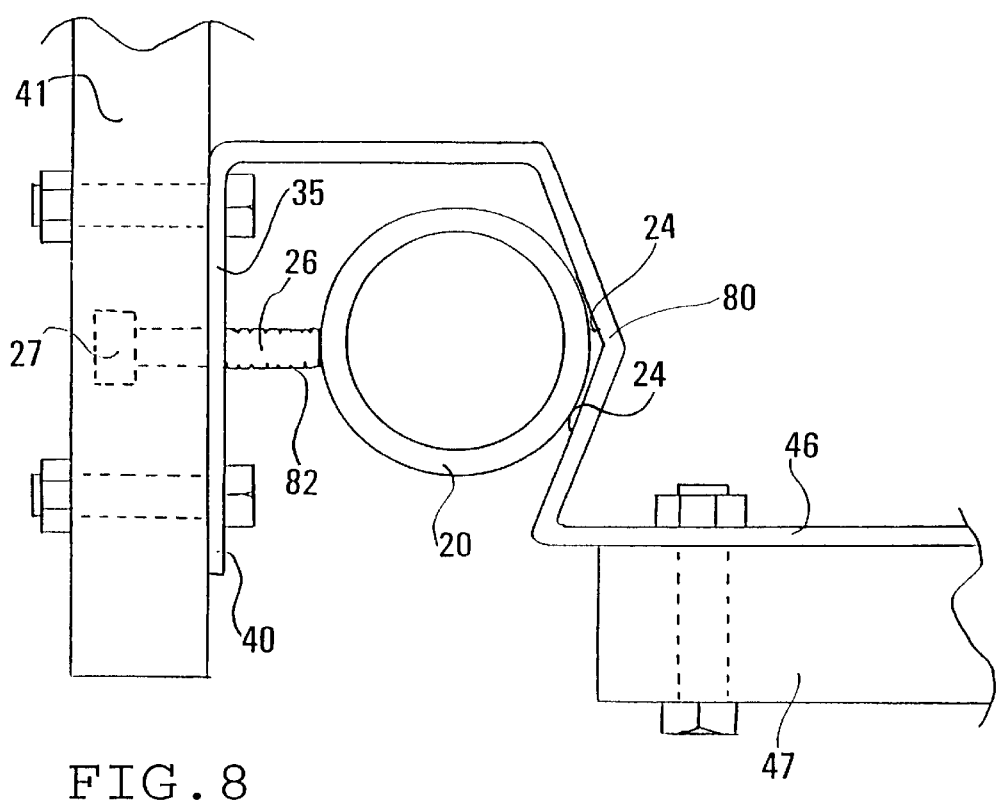
FIG. 8 is a schematic top view of a less preferred embodiment for a bracket of the invention, wherein the clamping screw for tightening extends perpendicularly from the first beam mounting base on which a dock section frame beam is to be mounted.

The optional arrangement illustrated in FIG. 8, while useful, is not ideal. Specifically, the orientation of the clamping screw shaft 82 at any angular orientation to the anchor wall greater than 70 or 80 degrees up to and including a perpendicular relationship, as illustrated in FIG. 8, creates a serious problem for access to the head 27 of the clamping screw for rotation of it in a threaded bore within the integrated anchor wall 40 (i.e., the first beam mounting base) and first side arm 35 of the clamp. To provide access to the head of the clamping screw so oriented, a hole may be bored through the beam mounted on the anchor wall 40 (or the beam may be shortened to not cover the clamping screw head). A major problem with the bracket as illustrated in FIG. 8 is that the location of the head 27 of the clamping screw may get covered when a further section or module of dock is attached at the edge where the clamping screw head is located, thus covering it and preventing access for dismantling purposes until after removal of the covering dock section. Note that the abutment surfaces 24 in FIG. 8 (against which a dock support post is pressed by the clamping screw 82) are wholly on the second side arm 80 of the FIG. 8 bracket.

To be emphasized is that framing edge beams for a dock section (e.g., cross beams and stringer beams for a dock section) may be formed from a variety of materials other than wood. Wood, of course, is an extraordinarily common material to use in forming the edge framing beams in dock section construction, but metal beams are also useful. Even plastic beams can be used. The material of construction is not particularly significant. What is significant is that the cross-sectional shape of the beams may take a variety of forms other than the usual 2×4 or 2×6 or 2×8 cross-sectional shapes for wood beams.

Figure 11:
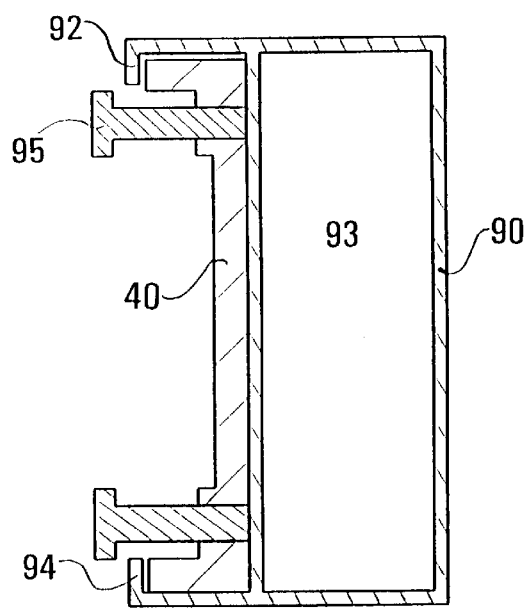
FIGS. 9, 10, and 11 illustrate an embodiment of the invention having a telescoping relationship between dock section beams and the bracket.
Figure 9:
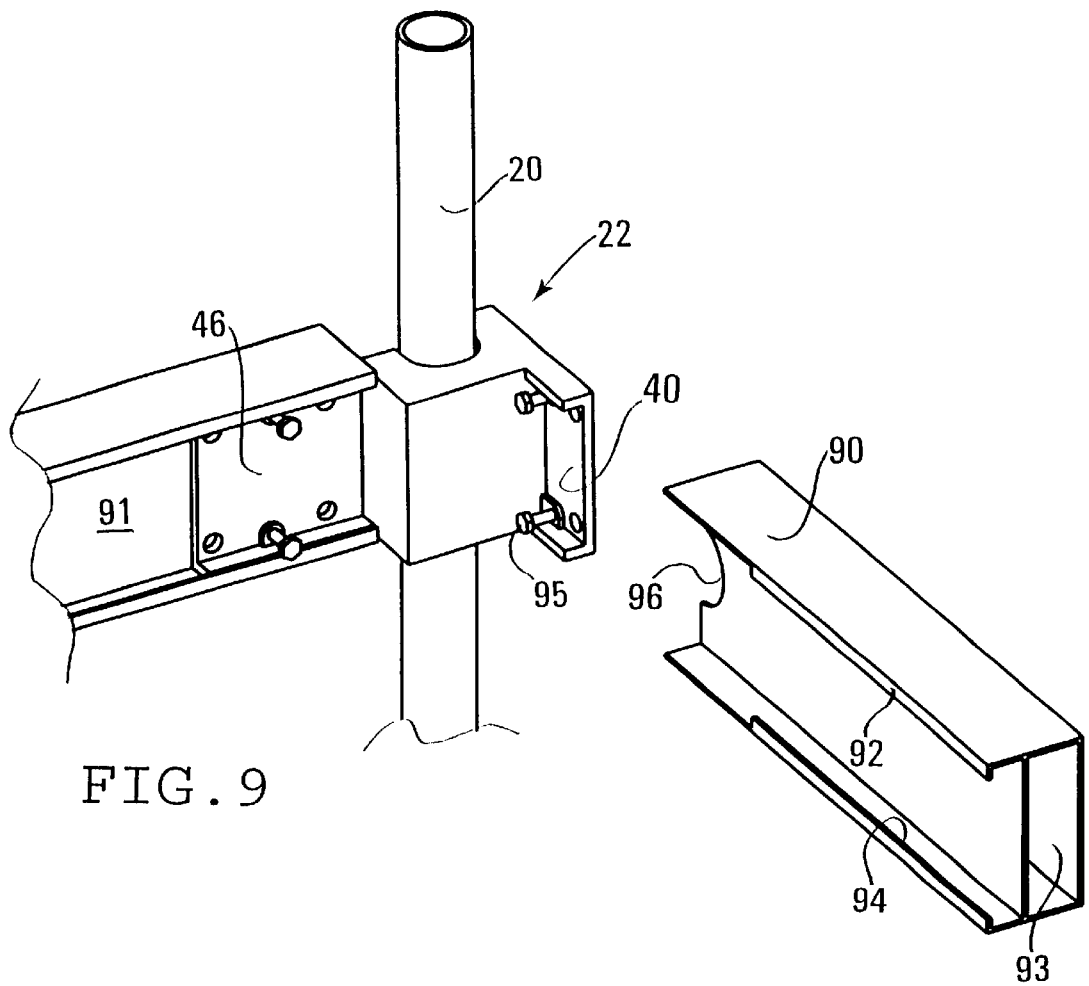
Figure 10:
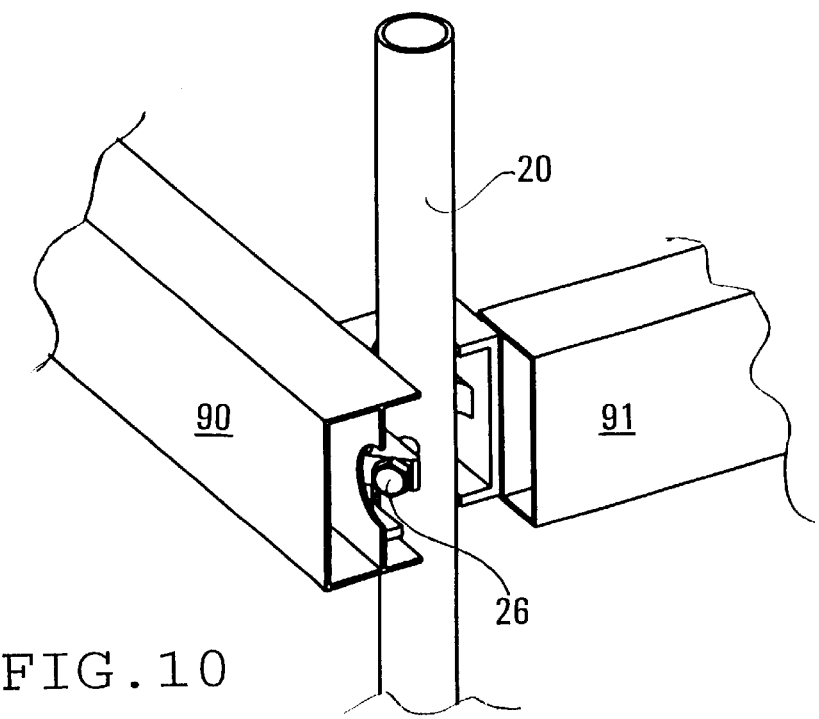

To illustrate, reference is made to FIGS. 9, 10, and 11. Note that beams 90 and 91 are of C-shaped cross-section, with the side arms 92 and 94 of the C beams curved inward (toward each other) to serve as gripping parts to hold the C shape of the beam against lateral displacement from a mounting base such as at 40 and 46 of the bracket 22. In FIG. 9, the beam 90 is spaced from but ready to be telescopingly mounted on the first beam mounting base 40. The second beam mounting base 46 carries the telescopingly mounted beam 91. After the beams are slidably-telescopingly-mounted, they are fixed in position either by employing a frictional fit or by employing set screws 95 or the like, or by welding. Extruded metal or plastic beams may be employed, and to enhance lightness of weight, a hollow interior 93 is useful. A portion of a beam may be cut away as at 96 to facilitate access to the clamping screw 26.

Figure 12:
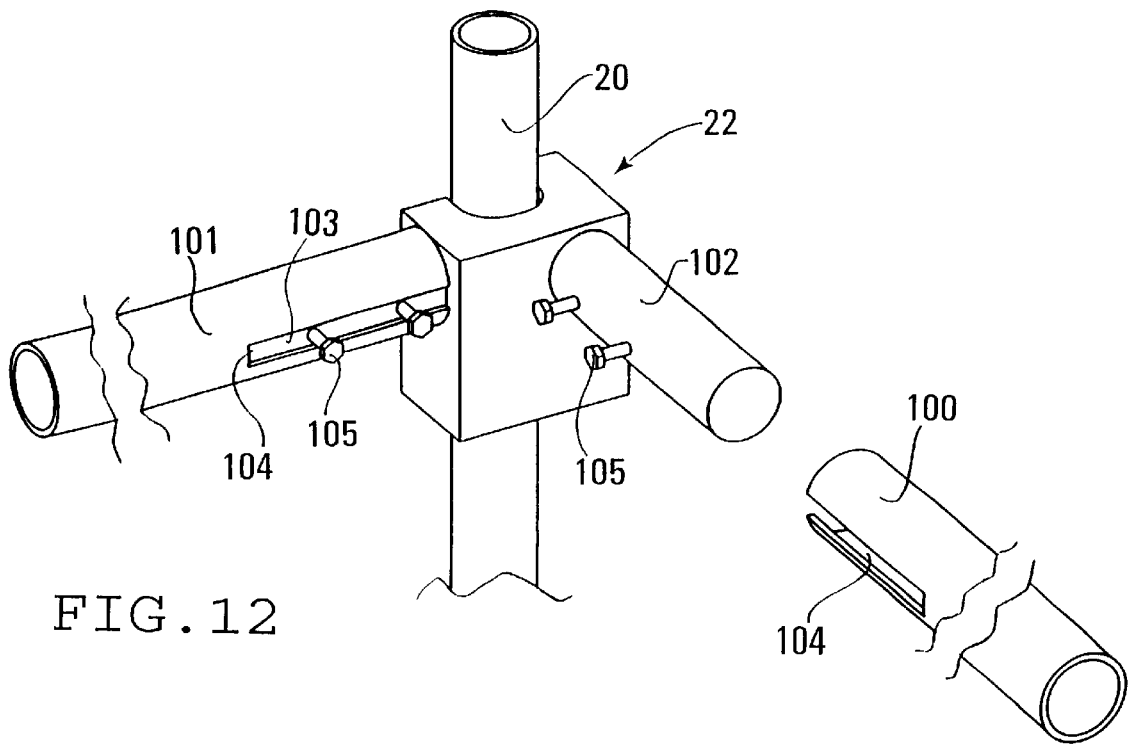
FIGS. 12 and 13 illustrate an embodiment of telescoped mounting using pipe-like beams.
Figure 13:
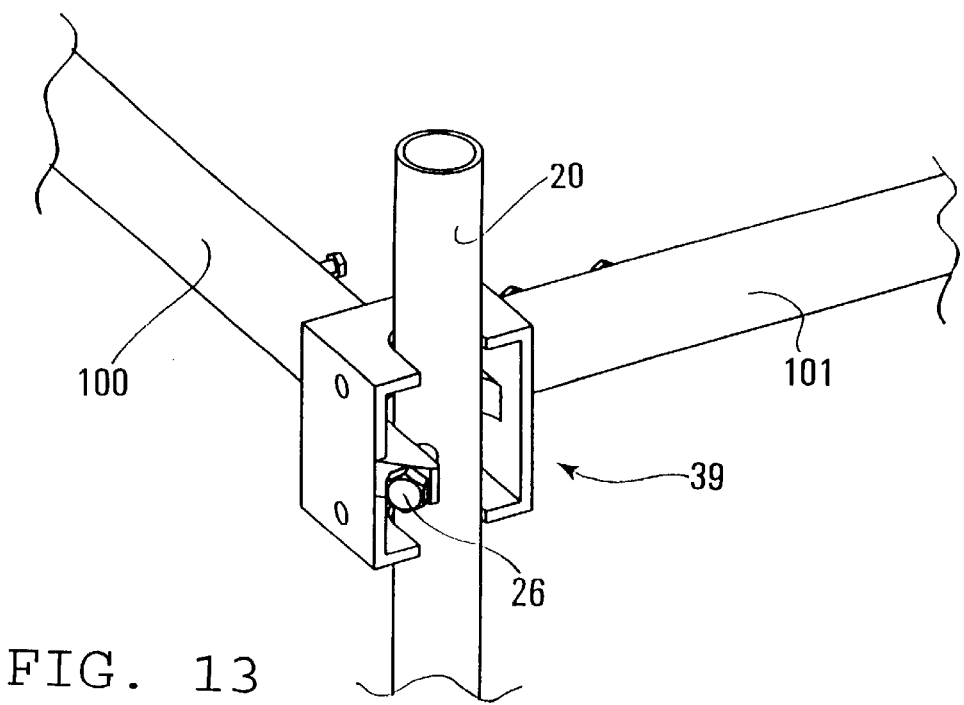

A further option is that beams of a tubular type may be employed as illustrated in FIGS. 12 and 13, in which event, the beam mounting bases 102 and 103 on which the tubular beams 100 and 101 are to be mounted should be modified to have an appropriate mating shape for receipt of the tubular beams 100 and 101. An axially parallel slot 104 extending along a side of a tubular beam from one end of it accommodates set screws 105 and permits sliding of the beam on the mounting base 102 and 103, after which the set screws 105 are tightened against the tubular beam as they are threaded into the beam mounting bases. Thus, a beam may be tubular and the mounting base to which the beam is affixed may be appropriately contoured (e.g., tubular) to provide a mating relationship (even a slidable telescoping relationship) with the tubular beam. Or a beam may be C-shaped or have other cross-sectional contours that mate slidably or telescopically with such beam contours. To put it succinctly, the first beam mounting base may comprise an elongated part having surfaces for receiving mating surfaces of a dock section first beam in a telescoping relationship; and similarly, the second beam mounting base may comprise an elongated part having surfaces for receiving mating surfaces of a dock section second beam in a telescoping relationship. The telescoping relationship may be such that the dock section beam slides outside or inside a beam mounting base on the bracket. Both the first and the second beam mounting base, as discussed herein, can vary in their surface mounting base characteristics; but in all instances, the mounting base must be such as to accept a secure mounting of a dock section beam without hindrance of the lateral access for a dock support post in the clamp portion of the new bracket.

Brackets made of carbon steel and nickel plated are especially attractive, but a variety of other materials may be used in fabricating brackets for successful dock structures of the invention. If desired, special gripping (high friction) surfaces may be formed on the abutment structure to enhance a non-slipping relationship to dock support posts.

An especially significant feature for a bracket of the invention is that it can be employed in dock construction in a variety of ways. The bracket as used at right angle corners for dock sections may be employed in a way that fixes stringer beams (i.e., the longer frame beams) to either the flange wall or the anchor wall; and crossbeams (i.e., the shorter transverse ones) may therefore be fixed to whichever wall (anchor or flange) not carrying a stringer beam. This is a significant advantage for economy and versatility of dock construction as those skilled in the art will readily recognize.

Further, those skilled in the art will readily recognize that this invention may be embodied in still other specific forms than discussed or illustrated without departing from the spirit or essential characteristics of it. The discussed embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. A dock support bracket for forming dock structures with minimal or no outwardly projecting edge hardware that could cause damage to water craft or injury to people, said bracket comprising (i) a central clamp of general C shape having an internal channel with a lateral access opening between the outer ends of first and second side arms of the C shape, said channel being adapted to laterally receive through said lateral access opening at least a substantial part of a dock support post therein and in alignment therewith, said clamp having an abutment structure internally facing said channel at a location a adjacent the outer end of said second side arm, and said clamp having a clamping screw mounted in said first side arm for applying pressure in an opposing relationship across said channel toward said abutment structure for the purpose of pressing any dock support post as may be placed in said channel against said abutment structure and fixing said entire bracket against slippage on any such dock support post, (ii) a first beam mounting base on said first side arm of said clamp, said first beam mounting base being for mounting a dock section first beam thereto in a manner causing said dock section first beam to extend in a direction substantially parallel to at least a portion of said first side arm, and (iii) a second beam mounting base on said second side arm of said clamp, said second beam mounting base being in an angular relationship to said second side arm so as to extend away from said second side arm and away from said first beam mounting base, said second beam mounting base being for mounting a dock section second beam thereto, (iv) said first beam mounting base and said second beam mounting base being spaced from each other by said clamp.

2. The bracket of claim 1 wherein the mounting of said clamping screw in said first side arm is at a location proximate to the outer end of said first side arm and in an angular relationship to the remainder of said first side arm.

3. The bracket of claim 1 wherein said first side arm of said clamp has a portion adjacent the outer end thereof that is in an angular relationship to the remainder of said first side arm and wherein the portion of said first side arm in said angular relationship is equipped with a threaded bore, and wherein said clamping screw is equipped with cooperating threads and mounted in said threaded bore.

4. The bracket of claim 1 wherein said central clamp has a back connection extending between the inner ends of said first and second side arms and wherein said abutment structure includes a portion of said back connection adjacent the inner end of said second side arm.

5. The bracket of claim 1 wherein said first beam mounting base extends beyond said first side arm in a direction substantially parallel to at least a portion of said first side arm and away from the inner end of said first side arm.

6. The bracket of claim 1 wherein said second beam mounting base is united to the outer end of said second side arm.

7. The bracket of claim 1 wherein said second beam mounting base is perpendicular to said first beam mounting base.

8. The bracket of claim 1 wherein said clamping screw is mounted in said first side arm at a location where said first beam mounting base is integral with at least a part of said first side arm, and wherein said clamping screw extends in a direction substantially perpendicular to said first beam mounting base.

9. The bracket of claim 1 wherein said first beam mounting base comprises an anchor wall at least part of which is integral with said first side arm of said clamp, and wherein said second beam mounting base comprises a flange wall united at one end thereof to said second side arm of said clamp.

10. The bracket of claim 1 wherein said first beam mounting base comprises an elongated part having surfaces for receiving mating surfaces of a dock section first beam in a telescoping relationship.

11. The bracket of claim 1 wherein said second beam mounting base comprises an elongated part having surfaces for receiving mating surfaces of a dock section second beam in a telescoping relationship.

12. A dock structure made up of at least two interconnectable deck sections, each of which is equipped with a structural beam along each edge thereof, and each of which has a dock support bracket according to claim 1 at the opposite ends of at least one said edge.

13. A dock support bracket for forming dock structures with minimal or no outwardly projecting edge hardware that could cause damage to water craft or injury to people, said bracket comprising (i) a central clamp of general C shape having an internal channel with a lateral access opening between the outer ends of first and second side arms of the C shape, said channel being adapted to laterally receive through said lateral access opening at least a substantial part of a dock support post therein and in alignment therewith, said clamp having an abutment structure internally facing said channel at a location adjacent the outer end of said second side arm, and said clamp having a clamping screw mounted in said first side arm for applying pressure in an opposing relationship across said channel toward said abutment structure for the purpose of pressing any dock support post as may be placed in said channel against said abutment structure and fixing said entire bracket against slippage on any such dock support post, (ii) an anchor wall at least a part of which is integral with said first side arm of said clamp, said anchor wall having an outer side for receiving a dock section first beam for mounting thereto and an inner side at least a part of which faces the internal channel of said clamp, and (iii) a flange wall united at one end thereof to said second side arm of said clamp in an angular relationship so as to extend away from said second side arm in an angular direction relative to said anchor wall, said flange wall having an outboard side for receiving a dock section second beam for mounting thereto, (iv) said anchor wall and said flange wall being spaced from each other by said clamp and being in planes parallel to said internal channel of said clamp.

14. The bracket of claim 13 wherein the mounting of said clamping screw in said first side arm is at a location proximate to the outer end of said first side arm and wherein said clamping screw is in an angular relationship to a portion of the said first side arm integral with said anchor wall.

15. The bracket of claim 13 wherein said first side arm of said clamp has a portion adjacent the outer end thereof that is in an angular relationship to the portion of said first side arm integral with said anchor wall and wherein the portion of said first side arm in said angular relationship is equipped with a threaded bore, and wherein said clamping screw is equipped with cooperating threads and mounted in said threaded bore.

16. The bracket of claim 13 wherein said central clamp has a back connection extending between the inner ends of said first and second side arms and wherein said abutment structure includes a portion of said back connection adjacent the inner end of said second side arm.

17. The bracket of claim 13 wherein said anchor wall extends beyond said first side arm in a direction substantially parallel to at least a portion of said first side arm and away from the inner end of said first side arm.

18. The bracket of claim 13 wherein said flange wall is united at its said one end to the outer end of said second side arm.

19. The bracket of claim 13 wherein said flange wall is perpendicular to said anchor wall.

20. The bracket of claim 13 wherein said clamping screw is mounted in said first side arm at a location where said anchor wall is integral with said first side arm, and wherein said clamping screw extends in a direction substantially perpendicular to said anchor wall.

21. A dock structure made up of at least two interconnectable rectangular deck sections, each of which is equipped with a structural beam along each lateral edge thereof and in perpendicular relationship to a structural beam along each end edge thereof, and each of which has a dock support bracket according to claim 13 at the opposite corners along one edge.

22. A dock support bracket for forming dock structures with minimal or no outwardly projecting edge hardware that could cause damage to watercraft or injury to people, said bracket comprising a central clamp of general C shape having first and second side arms with outer ends and having an internal channel with a lateral access opening between the outer ends of the first and second side arms of the C shape, said first side arm having a clamping screw and a first beam mounting base, said second side arm having an abutment structure internally facing said channel and having a second beam mounting base united to the outer end of said second side arm such that said second beam mounting base is in an angular relationship to said second side arm and extends away from said second side arm and away from said first beam mounting base, said clamping screw of said first beam mounting base being adapted to apply pressure in an opposing relationship across said channel toward said abutment structure.

23. The bracket of claim 22 wherein said clamping screw in said first side arm is at a location proximate to the outer end of said first side arm and in a portion of said first side arm at an angular relationship to the remainder of said first side arm.

24. The bracket of claim 22 wherein said first beam mounting base comprises an anchor wall at least part of which is integral with said first side arm of said clamp.

25. A dock structure having minimal or no outwardly projecting edge hardware that could cause damage to water craft or injury to people, said structure comprising a dock support bracket having a central clamp equipped with a first beam mounting base and a second beam mounting base, and a dock section having a perimeter edge including a first beam united to said bracket and a second beam united to said bracket in an angular relationship to said first beam, (i) said central clamp of said bracket being of general C shape such that it has an internal channel with a lateral access opening between the outer ends of first and second side arms of the C shape, said channel being adapted to laterally receive through said lateral access opening at least a substantial part of a dock support post therein and in alignment therewith, said clamp having an abutment structure internally facing said channel at a location adjacent the outer end of said second side arm, and said clamp having a clamping screw mounted in said first side arm for applying pressure in an opposing relationship across said channel toward said abutment structure for the purpose of pressing any dock support post as may be placed in said channel against said abutment structure and fixing said entire bracket against slippage on any such dock support post, (ii) said first beam mounting base of said bracket being on the outer side of said first side arm of said clamp and having said dock section first beam mounted thereto in a manner causing said dock section first beam to extend in a direction substantially parallel to at least a portion of said outer side of said first side arm, and (iii) said second beam mounting base of said bracket being united to the outer end of said second side arm of said clamp in an angular relationship to said second side arm so as to extend away from said second side arm and away from said first beam mounting base, said second beam mounting base having said dock section second beam mounted thereto in a manner such that said clamp of general C shape is between said first and second beams.

26. The dock structure of claim 25 additionally including a dock support post in said channel.

* * * * *